United States Patent Office 3,151,940
Patented Oct. 6, 1964

3,151,940
PROCESS FOR PRODUCING ALUMINA HYDRATE HAVING 1.2 TO 2.6 MOLES OF WATER OF HYDRATION
William L. Kehl, Indiana Township, Allegheny County, and Meredith M. Stewart, Penn Hills Township, Allegheny County, Pa., assignors to Gulf Research & Development Company, Pittsburgh, Pa., a corporation of Pennsylvania
No Drawing. Filed June 20, 1961, Ser. No. 118,279
8 Claims. (Cl. 23—143)

This invention relates to a crystalline alumina hydrate which has the approximate formula $Al_2O_3 \cdot 1.2-2.6H_2O$ and to a process for its preparation.

Alumina hydrates, which are precursors for catalytic aluminas, exist in a variety of forms. Each hydrate form is distinct from the others and upon dehydration yields a corresponding alumina having distinct physical and catalytic properties. The various hydrates include both amorphous and crystalline forms. Included among the crystalline forms are bayerite and boehmite. Bayerite is an alumina trihydrate, $Al_2O_3 \cdot 3H_2O$, and upon dehydration yields the catalytic alumina known as eta alumina. Boehmite is an alumina monohydrate, $Al_2O_3 \cdot H_2O$, and upon dehydration produces the catalytic alumina known as gamma alumina. The crystalline alumina hydrate prepared in accordance with this invention contains an intermediate quantity of water of hydration having less water of hydration than bayerite but more water of hydration than boehmite and having the approximate formula $Al_2O_3 \cdot 1.2-2.6H_2O$, but more commonly, $Al_2O_3 \cdot 1.4-2.4H_2O$. Upon dehydration this intermediate hydrate produces a distinct but not yet defined catalytic alumina form which is neither the eta alumina produced from bayerite nor the gamma alumina produced from boehmite.

That the intermediate alumina hydrate of this invention differs distinctly as a composition of matter as compared to both the higher hydrate, bayerite, and the lower hydrate, boehmite, is evident in many respects. One respect is that the intermediate alumina hydrate of this invention, following drying and calcination, when employed with iron group metals or noble metals, or mixtures thereof, results in catalysts of high activity in hydrogenative hydrocarbon conversion processes. For example, when the calcined anhydride of which the intermediate alumina of this invention is a precursor is employed as a support for certain catalytically active metals including platinum, palladium, nickel, cobalt, molybdenum, etc. the resulting catalyst possesses an especially high activity for the hydrogenative removal from hydrocarbon oils of deleterious impurities such as sulfur or nitrogen, as compared to eta alumina or gamma alumina, of which bayerite and boehmite, respectively, are precursors. The calcination product of the intermediate hydrate of this invention also has a distinct size distribution of pores in comparison to the calcination product of both bayerite and boehmite as determined by nitrogen adsorption tests.

Another distinction between the intermediate alumina hydrate of this invention, the higher hydrate, bayerite, and the lower hydrate, boehmite, is apparent by virtue of the differing water loss characteristics of each during calcination. Bayerite, after being dried at about 250° F. for the removal of mechanically held water, upon further heating or calcination starts to lose its chemically bound water at about 360° F. and its water loss is substantially complete at about 480° F., containing less than 3 percent by weight of water at the latter temperature. The bayerite is not converted to eta alumina until the heating temperature reach 450° C. Boehmite, after drying at about 250° F. for removal of mechanically held water, upon continued heating does not commence to lose its chemically bound water until reaching the temperature 750° F. and its water loss is substantially completed at about 930° F., at which temperature it contains less than 3 percent by weight of water. The conversion of boehmite to gamma alumina occurs at 850° F. The intermediate alumina hydrate of this invention, after losing its mechanically held water by drying at 250° F., upon further heating starts to lose its chemically bound water at 360° F. and completes its water loss at 930° F., at which temperature it contains less than 3 percent by weight of water. It achieves its, as yet undefined, anhydrate structural state at 850° F. in which state the anhydrate is substantially completely free of both eta alumina derived from bayerite and gamma alumina derived from boehmite. The discovery of distinct water loss temperature ranges for the various hydrates shows that each is distinct structurally from the other. It was also observed by X-ray diffraction tests that the intermediate hydrate of this invention does not dehydrate via the monohydrate, or boehmite, state. Therefore, both the drying data and X-ray diffraction data show that the anhydrate of the intermediate alumina is distinct structurally from both eta alumina derived from bayerite and gamma alumina derived from boehmite.

The conventional method for the preparation of an alumina hydrate is by preparing separate aqueous solutions, the first aqueous solution containing aluminum ions and the second aqueous solution containing hydroxyl ions. According to the conventional method the solution containing hydroxyl ions is added to the solution containing aluminum ions. However, this conventional method does not produce a single hydrate of high purity but rather a random mixture of various hydrates. For example, if the aqueous solution containing aluminum ions is aqueous aluminum chloride and the aqueous solution containing hydroxyl ions is aqueous ammonium hydroxide, before any hydroxide is added to the aluminum chloride solution the pH of this latter solution is about 2.3. The addition of ammonium hydroxide to the aluminum chloride solution causes its pH to increase and within the pH range 3 to 4.5 non-filterable but non-ionic colloidal sol forms having the formula $$Al(OH)_xCl_y,$$

where $x+y=3$. With continued addition of ammonium hydroxide, the dispersed non-ionized sol sets to a gel upon attaining a pH of about 5 to 5.5. Upon the formation of the gel the solution sets to such a high consistency that effective stirring is no longer possible. The product of this method is not a single hydrate but a varying mixture of hydrates including substantial quantities of bayerite, amorphous alumina and other hydrate forms such as gibbsite and nordstrandite.

In accordance with this invention an alumina hydrate containing between 1.2 and 2.6 moles of water per mole of $Al_2O_3$ is produced by formation of an immediate crystalline precipitate from an ionized solution by avoiding intermediate formation of a non-ionized sol which leads to a gel rather than a precipitate. Precipitate formation is accomplished by maintaining the pH of the mixing slurry in the basic rather than the acidic range throughout the mixing operation. In accordance with this invention, the final pH of the mixing slurry can range between 10.5 and 7 but is preferably between 8.5 and 7. Maintenance of this pH range during mixing is accomplished by adding the aqueous solution containing aluminum ions in small increments to an aqueous ammonia solution with thorough stirring. The concentrations of the two solutions, the proportions thereof, the rate of addition of the acidic salt solution to the ammonium hydroxide solution and the thorough mixing are adapted to maintain the pH of the mixture in the basic range throughout the operation.

Upon initially adding aqueous aluminum salt solution to aqueous ammonium hydroxide solution, the pH of the resulting mixture decreases rapidly to about 10.5. The crystalline precipitate which forms upon the addition of the aqueous aluminum salt solution to the aqueous ammonium hydroxide solution when the pH of the mixed solution is between 10.5 and 7 is $Al_2O_3 \cdot 1.2-2.6H_2O$. However, it has been found that this intermediate hydrate crystalline precipitate tends to become hydrated to the trihydrate, bayerite, if allowed to remain in contact with water. The transformation of the intermediate hydrate to bayerite by hydration when in the wet state is especially pronounced at room temperatures. At room temperatures and even at temperatures up to 170° F. the transformation of the intermediate hydrate when in the wet state to the trihydrate, bayerite, occurs most rapidly in the upper portion of the pH range of this invention while in the pH range 8.5 to 7 it occurs somewhat more slowly.

The transformation of the intermediate hydrate $$Al_2O_3 \cdot 1.2-2.6H_2O$$

to bayerite is strikingly evident by examination of various dry aluminas prepared from samples of the intermediate hydrate which have been aged in the presence of water for varying periods at room temperature. When the intermediate hydrate of this invention is immediately dried following precipitation, thereby preventing hydration to bayerite, upon calcination the resulting alumina product is colorless, opaque, glassy and quite hard. On the other hand, if the intermediate hydrate precipitate is permitted to age in the wet state at room temperature for a period of 24 hours or longer and then is dried and calcined the alumina product which results is not colorless but is chalky white and, rather than being hard, is quite soft. The chalky white alumina product is the eta alumina which is formed from bayerite. On the other hand, the glassy, hard alumina product formed upon drying and calcination of an intermediate hydrate precursor is distinct from eta alumina, but has not yet been defined.

We have now discovered that the intermediate alumina hydrate $Al_2O_3 \cdot 1.2-2.6H_2O$ can be stabilized against transformation when in the wet state by the presence of acetate ion. While the acetate ion prevents hydration of the intermediate hydrate to bayerite it does not influence the properties of the intermediate hydrate. The acetate ion should be present during the entire precipitation operation of the intermediate hydrate and remains in solution as long as the intermediate hydrate remains in the wet state.

The most desirable sources of acetate ion include acetic acid and ammonium acetate. These acetates are especially desirable since the cation does not remain as a residue in the alumina product. Other acetates which contain cations which can be effectively washed from the intermediate hydrate preicpitate can be employed.

The process of this invention comprises adding incrementally to an aqueous solution of ammonia, an aqueous solution of an aluminum salt accompanied by thorough stirring until the pH of the resulting mixture is between 10.5 and 7 to form a precipitate, the supernatant liquid of the precipitate containing acetate ions.

The temperature of the mixing operation can vary within wide limits. For example, it can be as low as the freezing point of the mixture. The employment of acetate ion in accordance with this invention is especially necessary at temperatures below 170° F. since transformation of the intermediate hydrate to bayerite only proceeds at temperatures below 170° F. When the mixing operation is performed at room temperatures the use of acetate ion is especially important for prevention of transformation to bayerite.

An acetate compound can be added to either the aqueous aluminum salt solution or to the aqueous ammonium hydroxide solution. Furthermore, it can be added to the reaction mixture of the two. After the mixing operation is complete the acetate must remain in the supernatant liquid associated with the intermediate hydrate precipitate as long as the precipitate remains in the wet state. This means that in order to prevent inception of transformation of the precipitate to bayerite the precipitate must remain in the presence of acetate ion until the removal of at least mechanically held water, i.e., until it is dried at a temperature of about 200° F. to 300° F.

The addition of the aqueous aluminum salt solution to the aqueous ammonium hydroxide solution is of necessity a prolonged operation. The aluminum salt must be added intermittently with thorough stirring between increments. The mixing must proceed sufficiently slowly that even localized zones having a pH below 7 are avoided since such local zones would yield an amorphous gel rather than a crystalline precipitate, thereby destroying the purity of the crystalline intermediate hydrate otherwise achievable.

The aqueous ammonium hydroxide solution which is employed can have a concentration range of ammonium hydroxide of about 0.1 to 4 molal. A similar concentration range for the aluminum salt solution is suitable. Dilute solutions of 1 or 2 molality are preferred.

It is important that hydroxides of alkali metals, such as sodium and potassium hydroxide, not be employed in place of ammonium hydroxide in the practice of this invention. These metals interfere with the production of the pure intermediate alumina hydrate precipitate of this invention. It appears the presence of metallic impurities such as sodium catalyzes dehydration of higher alumina hydrates to the monohydrate, known as boehmite. Furthermore, in contrast to volatile ammonia, these metals remain as impurities in the hydrate which is formed, even after prolonged washings, and tend to reduce the catalytic activity of the final product. On the other hand, ammonia, being volatile, is completely vaporized during the drying operation. A further disadvantage to the use of sodium or potassium hydroxide is that trace quantities of these metals drastically inhibit the ability of a catalyst containing dehydrated alumina to undergo reactivation by the common means of burning carbonaceous impurities from the catalyst surface since these metals have low melting points and act as fluxes, tending to sinter active catalytic sites during high temperature catalyst reactivation.

The amount of acetate ion present in the mixing solution must be adequate to prevent the transformation of the intermediate hydrate precipitate to bayerite. It was found that 0.1 molal acetate ion was ineffective but 0.2 molal acetate ion was effective. The mixing solution can have an acetate ion molality between .15 and 1. It has been found that enough acetic acid to reduce the pH of the mixing solution from a pH of 9 to 8 has been effective in preventing transformation of the intermediate hydrate to bayerite.

A variety of aqueous solutions of aluminum salts can be employed including aqueous solutions of aluminum chloride and aluminum nitrate. If desired, the acetate can be introduced by employing an aqueous solution of aluminum acetate. Aqueous solutions of other soluble aluminum salts of carboxylic acids such as aluminum formate or aluminum proprionate can be employed. Aqueous aluminum sulfate solution is not advantageous since it is difficult to adequately remove sulfate from the product even by protracted washings.

The intermediate hydrate precipitate can be separated from the supernatant liquid by filtration, decanting, centrifuging or the like and then washed, dried and calcined. After separation from the supernatant liquid the precipitate is washed until it is free from the anion of the aluminum salt. The precipitate can be washed with water but is preferably washed with aqueous ammonia. The wet precipitate has the approximate formula $$Al_2O_3 \cdot 1.2\text{--}2.6H_2O$$

When the wash water no longer exhibits traces of chlorine, nitrate or other anion of the aluminum salt, the intermediate hydrate is dried at about 200° F. to 300° F. to remove mechanically held water. It is then activated as a catalyst by calcining at a temperature of at least 850° F. and preferably at 900° F. to 1000° F. to remove almost all chemically combined water. The product of calcination is $Al_2O_3$ and is opaque, colorless, hard and contains less than 3 percent by weight of water. About 90 percent or more of its pore volume comprises pores having a radius sufficiently small to measure between 10 and 50 Angstrom units. The product of calcination not only predominates in small pores but also has a high surface area, as determined by nitrogen adsorption tests.

The invention is more completely illustrated in the following examples. In the tests, X-ray diffraction analyses were made after drying the precipitate for 16 hours but prior to calcination while the pore size distribution and other characteristics of the product of each test were obtained by nitrogen adsorption tests made after calcination of the product at 900° F. for 16 hours.

EXAMPLE 1

An alumina precipitate was formed by adding at room temperature a solution of aluminum chloride to ammonium hydroxide solution maintained at a pH of 9, and the precipitate was divided into two parts. One part was treated with dilute acetic acid, the other was not, and both parts were aged for 24 hours. X-ray diffraction analysis of the aged samples showed that the treated sample was an intermediate hydrate while the untreated sample was largely the trihydrate, bayerite, with only a small amount of the intermediate hydrate present. The characteristics of the treated and untreated samples after drying are shown in Table I.

*Table I*

|  | HAc Aged | No HAc Aged |
| --- | --- | --- |
| X-ray Pattern | (1) | (2) |
| Pore Volume (ml./gm.) | .44 | .39 |
| Average Pore Radius (A.) | 25 | 24 |
| Surface Area, B.E.T. (m²./gm.) | 357 | 330 |
| Pore Size Distribution, Percent volume/Pore Radius (A.): | | |
| >200 | 0.1 | 3.2 |
| 100/200 | 0.4 | 5.9 |
| 50/100 | 2.2 | 8.9 |
| 40/50 | 2.0 | 5.9 |
| 30/40 | 3.1 | 12.1 |
| 20/30 | 65.7 | 30.3 |
| 10/20 | 26.7 | 33.8 |
| <10 | 0.0 | 0.0 |

[1] Intermediate Hydrate.
[2] Bayerite.

EXAMPLE 2

Tests were made to determine the amount of acetate ion required to stabilize an intermediate hydrate precipitate at room temperature. A freshly prepared sample of intermediate hydrate was divided into four parts. The first part was dried immediately. The second part was slurried in water and allowed to stand for 24 hours at a pH of 9.5. The third part was slurried in water and the pH of the slurry was adjusted to 7.0 by the addition of dilute acetic acid. The fourth part was slurried in water and the pH of the slurry was adjusted to 8.0 with dilute acetic acid. The slurries were allowed to stand for 24 hours and then filtered and dried. The results of these tests are shown in Table II.

*Table II*

|  | No HAc Not Aged, pH = 9.5 | No HAc Aged, pH = 9.5 | HAc, pH = 7.0 Aged | HAc, pH = 8.0 Aged |
| --- | --- | --- | --- | --- |
| X-ray Pattern | (1) | (2) | (1) | (1) |
| Pore Volume (ml./gm.) | .39 | .40 | .39 | .39 |
| Average Pore Radius (A.) | 27 | 25 | 26 | 27 |
| Surface Area, B.E.T. (m²./gm.) | 289 | 330 | 309 | 293 |
| Pore Size Distribution, Percent Volume/Pore Radius (A.): | | | | |
| >200 | 0.4 | 1.2 | 0.4 | 0.3 |
| 100/200 | 1.5 | 4.8 | 1.7 | 1.1 |
| 50/100 | 2.9 | 9.9 | 4.0 | 2.3 |
| 40/50 | 6.0 | 5.6 | 5.4 | 6.3 |
| 30/40 | 14.2 | 15.2 | 13.7 | 18.0 |
| 20/30 | 54.0 | 33.4 | 49.5 | 49.5 |
| 10/20 | 21.1 | 29.8 | 25.4 | 22.6 |
| <10 | 0.0 | 0.0 | 0.0 | 0.0 |

[1] Intermediate Hydrate.
[2] Bayerite.

The data in Table II indicate that only small amounts of acetate ion are required to stabilize the intermediate hydrate against transformation to bayerite and the data also show that treatment with acetate ion does not significantly alter the preponderance of small pores in the product alumina derived from the intermediate hydrate.

EXAMPLE 3

200 grams of $AlCl_3 \cdot 6H_2O$ were dissolved in 1000 milliliters of $H_2O$. 1000 milliliters of $NH_4OH$ (28 percent $NH_3$) were mixed with 2000 milliliters of $H_2O$. 10 grams of glacial acetic acid were added to 1000 milliliters of $H_2O$ and then sufficient ammonium hydroxide solution was added to the acetic acid solution to bring the pH to 9.5. Then the aluminum chloride solution and the ammonium hydroxide solution were added independently and simultaneously to the third solution (with rapid stirring) at rates that maintained the pH of the resulting mixture between 8.5 and 9.5. The total time of addition was 17 minutes. The slurry was filtered and the precipitate was washed with water containing 1 gram of ammonium acetate per liter until the conductivity of the wash water showed that no further removal of soluble salts was being obtained. The precipitate was dried for 16 hours at 250° F. and examined by X-ray diffraction. Only the intermediate hydrate was present.

EXAMPLE 4

200 grams of $AlCl_3 \cdot H_2O$ were dissolved in 1000 milliliters of $H_2O$. 1000 milliliters of $NH_4OH$ (28 percent $NH_3$) were mixed with 2000 milliliters of $H_2O$. 10 grams of glacial acetic acid were added to 1000 milliliters of $H_2$ and then ammonium hydroxide solution was added to the acetic acid solution to bring the pH of this solution to 10.5. Then the aluminum chloride solution and the ammonium hydroxide solution were added simultaneously to the third solution (with rapid stirring) at rates that maintained the pH of the resulting mixture between 9.5 and 10.5. The total addition time was 17 minutes. The slurry was filtered and the precipitate was washed with water containing 1 gram of ammonium acetate per liter until the conductivity of the wash water showed that no further removal of soluble salts was being obtained. The precipitate was dried at 250° F. for 16 hours and examined by X-ray diffraction. Only the intermediate hydrate was found. No bayerite was present.

EXAMPLE 5

200 grams of $AlCl_3 \cdot 6H_2O$ were dissolved in 1000 milliliters of $H_2O$. 1000 milliliters of $NH_4OH$ (28 percent $NH_3$) were mixed with 2000 milliliters of $H_2O$. 10 grams of glacial acetic acid were added to 1000 milliliters of $H_2O$ and then ammonium hydroxide solution was added to the acetic acid solution to bring the pH of this solution to 11.5. Then the aluminum chloride solution and the ammonium hydroxide solution were added simultaneously to the third solution (with rapid stirring) at rates that maintained the pH of the resulting mixture between 10.5 and 11.5. The total time of addition was 20 minutes. The resulting slurry was filtered and the precipitate was washed with water containing 1 gram of ammonium acetate per liter until the conductivity of the wash water showed that no further removal of soluble salts was being obtained. The precipitate was dried at 250° F. for 16 hours and examined by X-ray diffraction. Bayerite was the major constituent indicating that the precipitation was performed at an excessively high pH. A small amount of intermediate hydrate was present and traces of gibbsite and nordstrandite were found.

Various changes and modifications can be made without departing from the spirit of this invention or the scope thereof as defined in the following claims.

We claim:

1. A process for producing alumina comprising slowly adding in increments a 0.1 to 4 molal aqueous acidic solution of an aluminum salt whose anion is removable from said alumina to a 0.1 to 4 molal aqueous alkali metal-free ammonium hydroxide solution, the addition of said aluminum salt solution to said ammonium hydroxide solution rapidly decreasing the pH of the ammonium hydroxide solution at least to a pH of 10.5, thereupon maintaining the pH in the mixing solution in the range between 10.5 and 7, avoiding even localized zones in said ammonium hydroxide solution below a pH of 7, precipitating a crystalline alumina hydrate containing between 1.2 and 2.6 moles of water of hydration per mole of $Al_2O_3$, maintaining acetate ion in the liquid associated with said alumina hydrate during the precipitation operation and substantially as long as said alumina hydrate is in the wet state to stabilize said hydrate, and drying said hydrate.

2. Claim 1 wherein the molality of said acetate ion in the mixing solution is at least 0.15.

3. Claim 1 wherein said aluminum salt is selected from the group consisting of aluminum chloride and aluminum nitrate.

4. A process for producing alumina comprising slowly adding in increments a 0.1 to 4 molal aqueous acidic solution of an aluminum salt whose anion is removable from said alumina to a 0.1 to 4 molal aqueous alkali metal-free ammonium hydroxide solution, the addition of said aluminum salt solution to said ammonium hydroxide solution rapidly decreasing the pH of the ammonium hydroxide solution at least to a pH of 10.5, thereupon maintaining the pH in the mixing solution in the range between 10.5 and 7, avoiding even localized zones in said ammonium hydroxide solution below a pH of 7, precipitating a crystalline alumina hydrate containing between 1.2 and 2.6 moles of water of hydration per mole of $Al_2O_3$, maintaining acetate ion in the liquid associated with said alumina hydrate during the precipitation operation and substantially as long as said alumina hydrate is in the wet state to stabilize said hydrate, drying said hydrate at a temperature between 200° F. and 300° F., and calcining said hydrate at a temperature of at least 850° F.

5. Claim 4 wherein said acetate ion is derived from a compound selected from the group consisting of acetic acid and ammonium acetate.

6. Claim 4 wherein said aluminum salt is selected from the group consisting of aluminum chloride and aluminum nitrate.

7. Claim 4 wherein the molality of said acetate ion in the mixing solution is at least 0.15.

8. Claim 4 wherein said alumina hydrate precipitate is substantially pure.

References Cited in the file of this patent

UNITED STATES PATENTS

| | | |
|---|---|---|
| 1,337,192 | Buchner | Apr. 20, 1920 |
| 1,540,446 | Wilson | June 2, 1925 |
| 1,929,942 | Barclay | Oct. 10, 1933 |
| 1,935,178 | Connolly | Nov. 14, 1933 |
| 1,953,201 | Tosterud | Apr. 3, 1934 |
| 1,976,875 | Connolly | Oct. 16, 1934 |
| 2,932,620 | Fuener et al. | Apr. 12, 1960 |

UNITED STATES PATENT OFFICE
CERTIFICATE OF CORRECTION

Patent No. 3,151,940                               October 6, 1964

William L. Kehl et al.

It is hereby certified that error appears in the above numbered patent requiring correction and that the said Letters Patent should read as corrected below.

Column 2, lines 13 and 14, lines 14 and 15, and line 24, for "anhydrate", each occurrence, read -- anhydride --; column 6, line 49, for "$AlCl_3 \cdot H_2O$" read -- $AlCl_3 \cdot 6H_2O$ --; line 53, for "$H_2$" read -- $H_2O$ --.

Signed and sealed this 9th day of February 1965.

(SEAL)
Attest:

ERNEST W. SWIDER
Attesting Officer

EDWARD J. BRENNER
Commissioner of Patents